(12) United States Patent
Joyce et al.

(10) Patent No.: US 9,110,790 B1
(45) Date of Patent: Aug. 18, 2015

(54) MANAGING MEMORY IN DISPLAYING DATA STORAGE SYSTEM INFORMATION

(75) Inventors: Scott E. Joyce, Foxborough, MA (US); Anirudh Takkallapally, Natick, MA (US); Vidhi Bhardwaj, Milford, MA (US); Sreenath Rajagopal, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 466 days.

(21) Appl. No.: 12/341,017

(22) Filed: Dec. 22, 2008

Related U.S. Application Data

(63) Continuation-in-part of application No. 12/164,407, filed on Jun. 30, 2008.

(51) Int. Cl.
G06F 9/44 (2006.01)
G06F 12/02 (2006.01)

(52) U.S. Cl.
CPC .................................. *G06F 12/0253* (2013.01)

(58) Field of Classification Search
CPC .................................................. G06F 12/0253
See application file for complete search history.

(56) References Cited

U.S. PATENT DOCUMENTS

| | | | | |
|---|---|---|---|---|
| 5,764,911 A * | 6/1998 | Tezuka et al. | ................. | 709/223 |
| 6,047,125 A * | 4/2000 | Agesen et al. | ................. | 717/148 |
| 6,219,678 B1 * | 4/2001 | Yelland et al. | ........................ | 1/1 |
| 6,407,761 B1 * | 6/2002 | Ching et al. | ................. | 715/835 |
| 6,701,520 B1 * | 3/2004 | Santosuosso et al. | ........ | 717/152 |
| 7,139,871 B2 * | 11/2006 | Mizuno | ......................... | 711/112 |
| 2002/0035706 A1 * | 3/2002 | Connor et al. | .................. | 714/15 |
| 2006/0010424 A1 * | 1/2006 | Burka et al. | .................. | 717/118 |
| 2007/0288892 A1 * | 12/2007 | Foti | ................................ | 717/114 |
| 2009/0178029 A1 * | 7/2009 | Akeel et al. | .................. | 717/125 |
| 2009/0320045 A1 * | 12/2009 | Griffith et al. | ................ | 719/315 |
| 2010/0146505 A1 * | 6/2010 | Almonte et al. | .................. | 718/1 |

* cited by examiner

*Primary Examiner* — Tarek Chbouki
(74) *Attorney, Agent, or Firm* — Deepika Bhayana; Jason A. Reyes; Krishnendu Gupta

(57) ABSTRACT

A method is used in managing memory in displaying data storage system information. A graphical user interface (GUI) is provided that includes a GUI component representative of a logical object in a data storage system. In an object pool, a software object is stored corresponding to the GUI component. In the object pool, the software object is made available for garbage collection when the GUI releases a reference to the software object.

17 Claims, 5 Drawing Sheets

MANAGING MEMORY IN DISPLAYING DATA STORAGE SYSTEM INFORMATION

CROSS REFERENCE TO RELATED APPLICATIONS

This application is a continuation-in-part of co-pending U.S. patent application Ser. No. 12/164,407 entitled "DISPLAYING DATA STORAGE SYSTEM INFORMATION" filed Jun. 30, 2008, the entirety of which patent application is hereby incorporated herein by reference for all purposes.

BACKGROUND

1. Field of the Invention

The present invention relates to managing memory in displaying data storage system information.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One example of this kind of graphical user interface includes a screen presentation that may include toolbars with accompanying menus and menu items as well as displays such as graphs, maps or trees.

In a display to which the term "tree" presentation or display is applied, one element in the tree is visually connected from another element in the tree somewhat reminiscent of a tree-branching, giving rise to the term. This display would be familiar to users of various commercially-available software packages, such as Microsoft's Windows Explorer® software. The element at treetop is normally called a "root node" or "parent" and elements connected directly below and from that root node are termed "children" of that root node. Children of that root node's children are "grandchildren" of the root node, etc., comprising the "descendents" of that root node. Any child node in the descendent hierarchy can be selected or considered as a "local root node" for its descendents. These displayed nodes, which are visible to computer users, are normally constructed within the computer system or network as software "objects" which are then handled or controlled by object-oriented software running in the system or network.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), Java, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.). These tangible objects (nodes) within the storage processor in the storage system can send messages to each other within the storage system and to other objects outside the storage system over the network with which they are operatively coupled. The relationship between these specific objects in the storage processor is usually visualized or characterized as the tree to which reference was earlier made. In this tree, many children may typically hang from the same parent. In addition to these kinds of tangible objects, logical units (LUNs) are other nodes or objects that can be contained within a tree. Also, the storage processor itself and/or the storage system itself can be objects and interact as individual nodes, respectively, with other nodes in their network.

The tree relationship of these node objects may be displayed in tree fashion on the terminal screen of the GUI. This display is controlled, in part, by a large, fixed body of complex code which "paints" this tree display on the terminal screen.

With respect to the complex code, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object orientated programming language and a platform on which to run the Java applications. Java is both a compiled and an interpreted language. The source code that has been written by the application developer is compiled into an intermediate form called a Java bytecode, which is a platform independent language. At a client machine, the java bytecodes are interpreted by the Java platform and the Java interpreter parses and runs each Java bytecode instruction on the computer. (If the Java bytecode is run as a applet, it may first be sent over the network to the client machine.)

Java's objected orientated programming language is based on using objects and classes and this paragraph will introduce the reader to a few basic concepts. Just like real world objects, software objects consist of a state and a behavior. A software object maintains its state in one or more variables and a variable is an item of data named by an identifier. A software object implements its behavior with methods and a method is a function associated with an object. Just like any other objected orientated programming language objects communicate with each other by passing messages. Further object orientated concepts are well known in the art and will not be described here further.

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

The JVM running on a particular computer can be divided into four basic parts: the registers, the stack, the garbage-collected heap, and the method area.

Like at least some other object-orientated applications, a Java application typically allocates new objects to a region of the system memory within a data processing system commonly referred to as the 'heap' and each JVM has its own heap. Java does not have a 'free' or 'delete' method, which allows a Java application to free objects that are no longer required by the system. Instead when a Java application executes on a particular computer platform the Java application relies on a garbage collection process which is the responsibility of the JVM, to reclaim space within the heap that is no longer utilized by previously allocated objects.

In general, an object is determined as being live while there is an object reference pointer to it somewhere in the active state of the JVM and therefore the object is able to be located. When an object ceases to be referenced from the active state within the JVM it can be classified as garbage. The memory space occupied by the object can then be reclaimed for reuse and garbage collected. Garbage collection is usually triggered whenever the Java application attempts to create a new object, and it is determined that there is insufficient free space available within the heap to satisfy an object allocation.

Garbage collection is usually performed in a synchronous manner. Generally, the synchronous garbage collection begins its operation by temporarily stopping all Java applications within the JVM. The synchronous garbage collection then traverses a Java stack and the heap in order to search for all the active objects and their children. These active objects and their children are then marked accordingly. Afterwards the heap is searched again for a second time to reclaim any space previously utilized by the unmarked objects. Finally the Java applications are restarted again. This type of garbage collection is typically called "stop the world" as all applications are stopped while garbage collection is performed and restarted when the garbage collection process has finished.

One way to overcome part of the performance penalty of automatic garbage collection is to create groups of objects known as object pools that are still in use as far as the garbage collection mechanism is concerned, but are actually not used. When a new object is needed, one of these objects in the pool can be returned without going to the heap to allocate a new storage element. Pools thus provide one way to "recycle" used objects in a way that provides significant performance benefits.

A technique for finer grain of control for Java program's interaction with the garbage collection is Reference Object Application Programming Interface (API). The reference object encapsulates a regular reference to a Java object. The API defines the following reference types: soft reference, weak reference, and phantom reference in order of reachability. The impact on garbage collection is that the weaker the reference the more the incentive for the garbage collector to free its memory. Creating appropriate references using the Reference Object API gives the programmer more control over what memory is freed by the garbage collector.

SUMMARY OF THE INVENTION

A method is used in managing memory in displaying data storage system information. A graphical user interface (GUI) is provided that includes a GUI component representative of a logical object in a data storage system. In an object pool, a software object is stored corresponding to the GUI component. In the object pool, the software object is made available for garbage collection when the GUI releases a reference to the software object.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in managing memory in displaying data storage system information. In accordance with the technique, configurable memory management can be provided.

In at least one implementation, an application contains an object pool that holds a reference to the objects in the application's data model (e.g., LUNs, disks). This object pool allows components in the application to share and reuse these objects so that they do not need to be duplicated.

As described in more detail below, the object pool can be customized at runtime to behave differently and potentially meet different customers' needs. Options include hard reference, soft reference, and weak reference. In the hard reference case, the pool grows forever and never releases any objects. This causes more memory usage but can increase performance by preventing more network calls (in at least some cases).

In the weak reference case, the pool releases the resources of the object if no entity holds a reference to the object. This is potentially the best option to reduce overall memory usage but may also reduce performance since some network calls may be needed to re-obtain the object and to clean up the resources.

In the soft reference case, the pool releases resources of the object if the memory usage is high and no entity has a reference to the object. In at least one implementation, this is the default and provides a balance between memory and performance.

Figure 1:
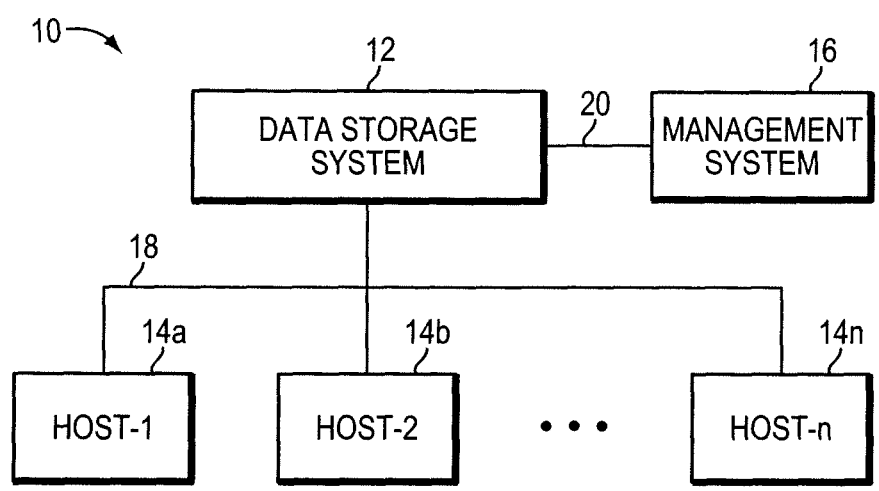
FIGS. 1-6 are block diagrams of at least part of a system that may be used in managing threads.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
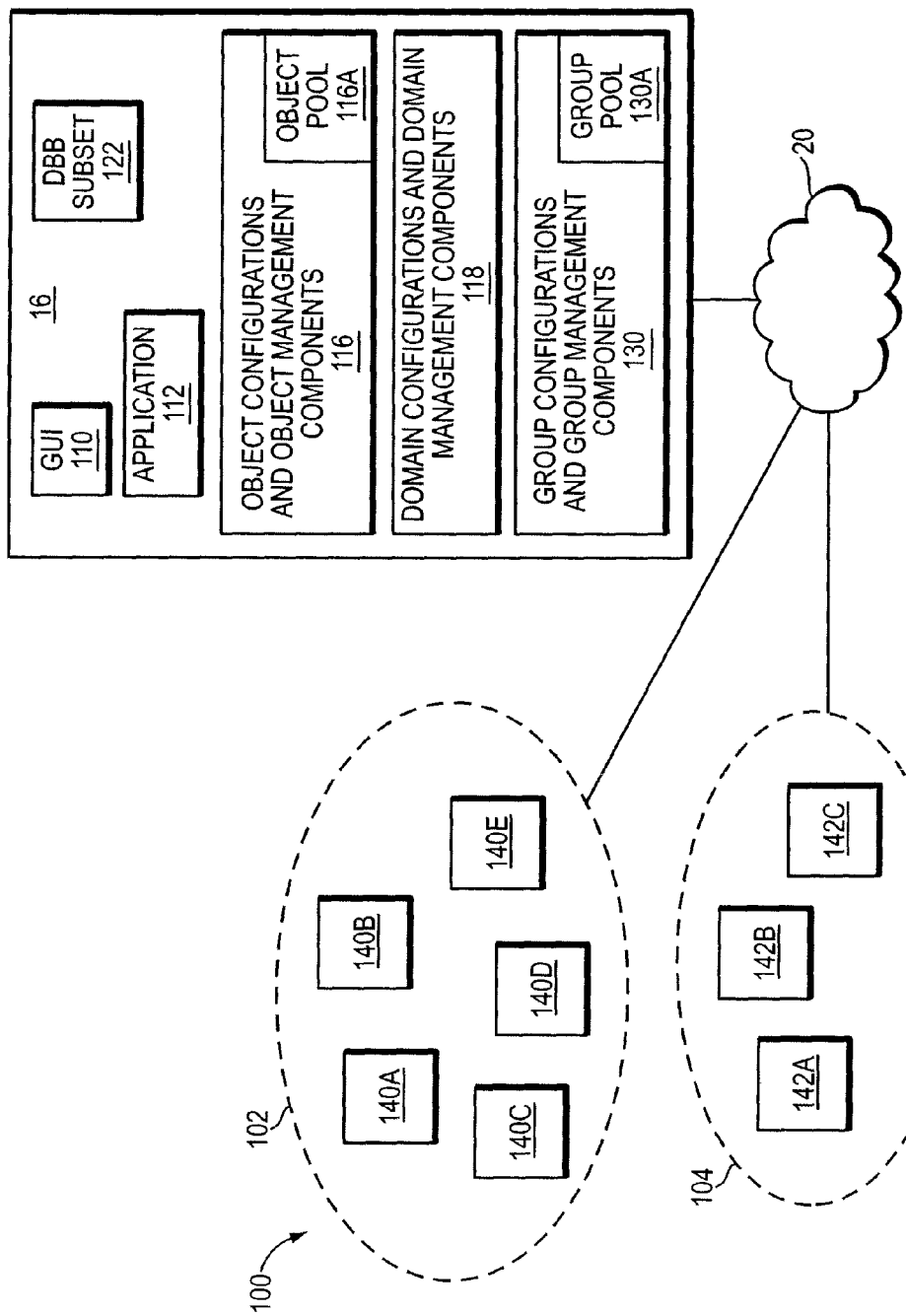

Referring now to FIG. 2, shown is an example 100 of components that may be used in connection with the technique described herein. Included in the example 100 are domains 102 and 104, components that may be included in the management system 16, and communication connection 20. A domain may be defined as a functionally bounded set of interconnected components, such as data storage systems, that communicate and/or cooperate for a common purpose. The particular data storage systems included in a domain may be user-configured. A user may want to perform operations for data storage system management at the domain level (e.g., for the data storage systems included in a domain). Thus, a user may accordingly configure one or more domains. In this example, two domains 102 and 104 are specified although an embodiment may include a varying number of one or more domains. Each of the domains 102 and 104 may be configured to include one or more data storage systems. The domain 102 includes data storage systems 140a-140e. The domain 104 includes data storage system 142a-142c. It should be noted that in one embodiment, the same storage system may not belong to more than a single domain at any particular time.

The components of the management system 16 may include a graphical user interface (GUI) 110, one or more applications 112, object configurations and object management components 116, domain configurations and domain management components 118, a directory database (DDB) subset 122, and group configurations and group management components 130.

The GUI 110, e.g., a Java applet making network calls to a management interface in data storage systems 12, may be used in connection with interfacing with a user, such as a data storage system manager. The GUI 110 may be used to obtain input in connection with inquiries to be made regarding one or more domains. The GUI 110 may also be used in connection with displaying output, for example, in response to obtaining information for requested inquiries regarding the one or more domains. The GUI 110 may be used in connection with one or more applications 112 for performing system management of the data storage systems included in domains 102 and 104.

The domain configuration and domain management components 118 may be used in connection with storing information about what nodes are included in each configured domain. If changes are made to a domain configuration such as, for example, in connection with the addition and/or removal of a data storage system, domain management components may accordingly update the configuration of the affected domain(s). One embodiment of a domain and supporting components as may be included in the management system 16 is described in more detail in U.S. patent application Ser. No. 10/242,521, entitled "ROBUST INDICATION PROCESSING FAILURE MODE HANDLING", filed on Sep. 12, 2002, assigned to EMC Corporation, which is incorporated by reference herein. It should be noted that the foregoing embodiment includes components and describes processing as may be included in a system specifying a failover processor for a data storage system. In the foregoing application incorporated by reference, each data storage system includes multiple processors forming a cluster. Only one of the processors is designated as active at any time. The foregoing application further describes maintaining communication with a designated active one of the cluster's processors and designating another of the cluster's processors in the event an active processor fails or is otherwise not available for use. It will be appreciated by those skilled in the art that the technique may also be used in connection with an embodiment that does not include distributed information roll-up or the foregoing failover functionality and/or does not utilize a node having multiple processors.

The object configurations and object management components 116 may be used in connection with management of objects associated with the data storage systems of domains 102 and 104. As described herein, an object may refer to an entity commonly used in connection with object oriented programming. An embodiment of an object may be defined as a data container including data and/or instructions to be used in connection with accessing a particular object. An object may be associated with an entity in a domain for monitoring or observing a component such as in connection with the management of data storage systems. An object may represent a real-world entity such as a hardware or software entity. Examples of such hardware or software entities may be, for example, an application executing on a server, a LUN, disk, port, fan, and the like. The entity may be a physically or a logically defined entity as may be included in a node of the domain.

The element 116 may include an object pool 116a representing a subset of all objects that may be defined for a given system, such as illustrated herein. The contents of the object pool may vary in accordance with the particular operations being performed by the GUI 110. Information about each of the objects may be stored on each node for which the object is defined. In other words, each node includes information about its own objects. The particular subset of objects included in the object pool may vary in accordance with the operation performed via the GUI since the object pool is used in facilitating GUI operations. For example, if the user is performing an operation to view objects defined for a first data storage system, the object pool may include that subset of objects defined for the first data storage system. If the user subsequently views objects defined for a second different data storage system, the object pool may be updated to include a different subset of objects defined for the second data storage system.

The element 116 may represent collectively the components for maintaining and management of the object pool 116a. The object management components included in 116 may handle management of the foregoing object pool including, for example, retrieving updated information about which objects are defined for a node at the time of a user selection. The components in 116 may retrieve such information and maintain the lists of objects defined for each node using any one or more different ways. In one embodiment, an inquiry may be sent to each node requesting a list of all objects when needed such as, for example, when the user is defining groups and requests a list of objects defined for a particular node.

Group configurations and group management components 130 may be used in connection with defined groups of objects. In one embodiment, groups may include user-configured groups. A user, such as a data storage system manager, may associate one or more objects with a particular group. During operation of a system, the user may also update or reconfigure the defined groups. In connection with the GUI, a group may be displayed as, for example, a folder. Objects included in a group may span one or more physical data storage systems included in a domain. For example, a group may be defined for all LUNs. A group may also be defined for a subset of a particular resource, such as a portion of devices or volumes including critical data as may be used by a particular application or for a specific business function or purpose. A group may also include objects associated with different types of resources. For example, a group may be defined to include all objects associated with a particular data storage system. The objects may include all ports, LUNS, applications, and the like.

The group may be defined to recursively include a subset of objects within a domain. In one embodiment, a group may also be defined to include other groups. In other words, an element of a first group may be a second group or an object. The particular objects included in the first group may be defined by repeatedly determining all the objects in each nested group, such as the second group. It should be noted that an embodiment may allow for a group nesting of a predetermined depth or number of levels. The value may be user configurable in an embodiment.

The element 130 may include a group pool 130a representing a subset of all possible group information for all groups defined in a given system such as 10. As with the particular subset of objects included in the foregoing object pool, the particular subset of group information included in 130a varies in accordance with the particular operation performed by the GUI 110. Element 130 may also collectively represent components used in connection with management and maintenance of the group pool 130a.

In one embodiment, a user may select which objects on a particular data storage systems are included in a particular group. Group definitions may be made, for example, using the GUI 110 by repeatedly selecting from displayed objects defined for different nodes. Tables or lists of objects defined for each node as used by the GUI may be stored in the object pool 116a during the foregoing displaying and selecting process for defining a group.

The DDB subset 122, as included in the management system 16, may be used in connection with facilitating communication between elements in the domain. The DDB subset 122 may be a subset of the entire persistent DDB as may be stored on each node of the domains. As illustrated in connection with other figures herein, the DDB may be distributed throughout the entire network and included in each node of the domain. The DDB may be characterized as a generic directory of persistently stored data which is maintained and recoverable, for example, in the event of a power failure. Each node included in the domain may have an address or associated entry in the DDB. A first node wishing to communicate with another node in the domain may obtain the address layout or other information in order to communicate with the other node from the DDB. The DDB may be viewed as a database of address listings for entities in an embodiment. The particular entities listed may vary with each embodiment but may include address information for all nodes in a domain. Addresses may also be included in the DDB for other entities as may be included and used in an embodiment. In one embodiment, all nodes may mount a shared drive accessing a file or other data container including a common set of directory information as may be held in a single central location. Another embodiment of the DDB is described in U.S. patent application Ser. No. 09/965,430, filed Sep. 27, 2001, entitled "MANAGING A DISTRIBUTED DATABASE CACHE", which is incorporated by reference herein. As will be appreciated by those skilled in the art, other embodiments of a DDB may be used. The DDB may be used in facilitating gathering of information using distributed information roll-up.

The particular subset of the DDB 122 included in 16 may vary in accordance with the particular operations performed by the GUI 110 since the element 122, along with 116a and 130a, may be used to facilitate GUI operations.

The data storage systems included in the domains 102 and 104 may be, for example, data storage systems as manufactured by a single vendor such as EMC Corporation. An embodiment may also include data storage systems from multiple vendors. These, and other particulars described herein for the purposes of example and illustration should not be construed as a limitation of the technique. The data storage systems included in the domains 102 and 104 and the management system 16 may communicate through the communication connection 20. In this example, the connection 20 may be a network connection although other types of connections may be used. The particular type of communication paths may vary in accordance with each embodiment. For example, the communication path used in connection with data storage management may also include a switching fabric. The types of connections used for data storage system management and/or I/O may include, for example, a fibre channel, SCSI, iSCSI or other communication connection.

It should be noted that the particular one or more components that may be included in the management system 16 may vary with each particular embodiment. As described elsewhere herein, the management system 16 may include, for example, a computer system which has a processor and a display device. The processor may execute instructions to display information about the storage system to a storage system manager. Software executing on the computer system of the management system 16 may also be used in connection with obtaining user input, such as may be obtained from the data storage system manager in connection with monitoring data storage systems.

The number and type of components included in management system 16 may vary with the complexity of the storage system as well as the particular applications and tasks performed in an embodiment. For example, management system 16 may include only a single computer system or processor with a single display device. Alternatively, an embodiment may require greater complexity in connection with management of the data storage system. Thus, the management system 16 may also include additional software and/or hardware Data storage system management may be used in connection with one or more data storage systems in an embodiment of the computer system 10 of FIG. 1.

In an example implementation, a user may manipulate, monitor and view data regarding groups of objects for a particular domain in connection with distributed information roll-up. Each node in a domain rolls up a partial view of requested information for objects of a particular group or groups included in, or defined on, that node. For each domain, a node may be designated as a central collector which communicates with the GUI in connection with processing a request. In this embodiment, this may be a request to gather information on one or more nodes in a domain in connection with management thereof. The central collector may be a node, such as a data storage system, included in the domain. In one embodiment, the central collector asks other nodes in the domain to determine partial views for objects included in one or more groups. These partial views are then reported back to the central collector for consolidation into a single report which is then communicated to the requestor, such as the GUI 110 in connection with a user request for information about objects in one or more groups. For example, a request may be made to provide the average throughout of I/Os associated with objects in a group. The central collector node receives the request and determines its partial view. The central collector determines the throughput of I/Os for objects in the particular group as included in the central collector. Additionally, the central collector node forwards the request on to other nodes to similarly determine their partial views of objects in the group. In other words, each of the other nodes also determines the throughput of I/Os for objects in the particular group as included in, or defined on, each node. The information is returned to the central collector which then consolidates the received information. The central collector may also perform any additional computation needed. For example, with reference to the average throughput of I/Os, an average is desired. If all received information is the throughput of I/O's, the central collector takes the average of this. The central collector may receive as return information about each other node, for example, the total number of I/Os and the associated total number of objects. Using the foregoing information, the central collector may take the average and return this to the GUI. The central collector may dynamically make this request of all other nodes in the domain to determine and return the requested information.

The central collector may be selected, for example, by a user. An embodiment may also use other ways in connection with selection of a central collector. Such ways may include, for example, an executing process making a selection based on one or more heuristics.

In one embodiment, the central collector may utilize request forwarding in connection with distributed information roll-up. Request forwarding is described in detail in U.S. patent application Ser. No. 09/877,862, filed on Jun. 8, 2001, entitled SCALABLE COMMUNICATION WITHIN A DISTRIBUTED SYSTEM USING DYNAMIC COMMUNICATION TREES, which is incorporated by reference herein. Request forwarding utilizes a tree structure of the nodes in a domain in which the root of the tree may be the central collector. The central collector forwards the request down the tree toward the leaf nodes by instructing each node in the next level to similarly determine and report its own local view of objects in the requested group. If a node has nothing to add regarding the request (e.g., the node has nothing about the objects referenced in the request), the node may act as a conduit and further forward the request down to other nodes and similarly return information back up through its parent to the node originating the request. The central collector also requests each node in the next level to collect information from any of its child nodes and form a consolidated report of any collected information along with its own local view. This process of request forwarding is continued until the leaf nodes are reached. At this point, the leaf nodes determine their local views and report this information back up the tree to their respective parent node. The parent nodes collect the reported information from all their respective children (which includes information for all descendants of the child nodes) and form a consolidated report of this information and any local information from the parent node. The parent node then returns this consolidated information to its parent, and so on. The information is reported up the tree until the root node is reached. The tree is dynamic in that it may be determined at the time the information is being gathered. In response to a second request at a later time for the same information, a different tree may be determined.

Using the foregoing request forwarding, each node in the domain has connectivity to each other node in the domain. The respective addresses of nodes in the domain may be included and maintained in the DDB as illustrated in various figures herein. One embodiment for managing the DDB is described in more detail in U.S. patent application Ser. No. 09/965,430, filed on Sep. 27, 2001, entitled MANAGING A DISTRIBUTED DIRECTORY DATABASE, which is incorporated by reference herein.

In an embodiment in which each node in the domain has connectivity to every other node in the domain, any one of the nodes may be selected as the central collector node. In an embodiment, selection of the central collector node selection may be in accordance with the capabilities specific to each node. For instance, if one node is a low-end system with limited processing power, it may not have sufficient resource to function as a collector node.

In an embodiment in which the nodes in the domain do not have connectivity to other nodes, an alternate way may be used. The central collector node selected may have connectivity to each of the other nodes in the domain individually but the other nodes in the domain may not have connectivity to each other. In this instance, the central collector node may collect or gather the partial views of each other node in the domain. In one aspect, a tree of level 1 is used in which the collector is the root node and communicates directly with all the nodes in the domain as leaf nodes.

It should be noted that the central collector node may be a data storage system or it may be another computer system such as a personal computer. The data storage systems used in connection with the embodiment described herein include one or more processors that are used in executing code to perform the reporting and other processing described herein.

It should be noted that the groups of objects can be defined for any particular criteria. Examples may include groupings based on hardware characteristics, such as all disks meeting certain criteria, all LUNs, and the like. Queries or inquiries made with respect to the groups can be, for example, performance based to facilitate data storage system management.

Figure 3:
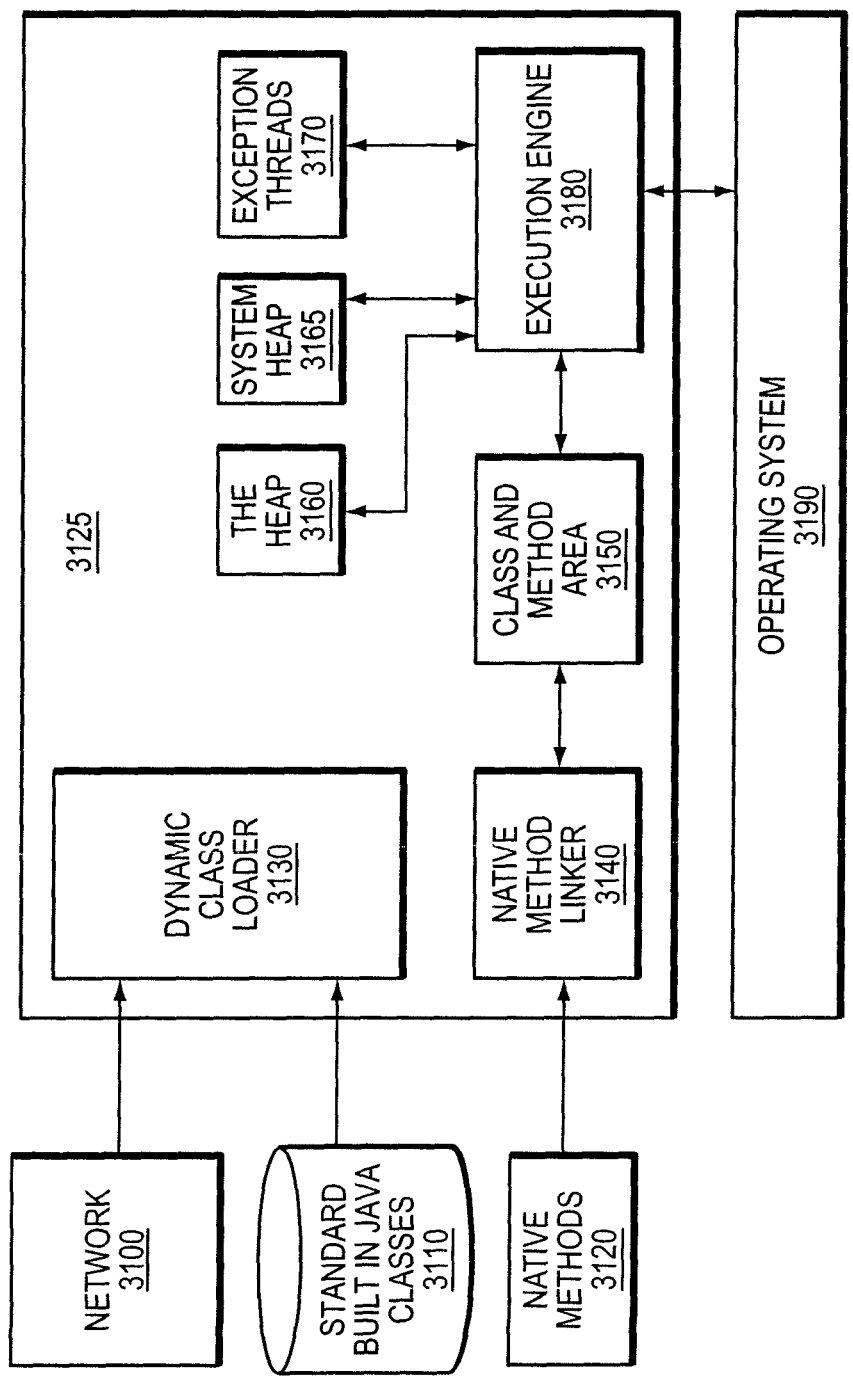

FIG. 3 is a block diagram illustrating an example of a Java runtime environment as it exists in system 16. A Java application can create new objects and arrays, which the JVM 3125 stores in a block of memory called the heap 3160. A system heap 3165 stores the shared data that the individually running JVMs share in a data processing system.

The execution engine 3180 carries out the instructions contained in the byte code of a Java method. The dynamic class loader 3130 loads the classes that a Java program requires in order to run. The loading of the classes involves obtaining in bytes the Java class file that defines a class. This can be achieved by reading a file from a disk or over a network 3100 which may be or include medium 18 and/or medium 20. Java uses exception threads 3170 to signal that there is an error within the program. Each method defines an exception handler table that lists which exceptions the method catches.

Classes can contain native method 3120 declarations. The body of the method is not provided as Java bytecode in a class file, but instead is written using another programming language and compiled into machine code stored in a separate Dynamic Link Library (DLL) which is an executable program module that performs a particular function, or a shared library. Runtime systems include code to dynamically load and execute the code in native methods using calls made to the operating system 3190 that use DLL's in Microsoft Windows, which is a trademark of Microsoft Corp, or shared libraries in UNIX. Once a native method 3120 has been linked into the runtime system by native method linker 3140, the execution engine 3180 traps calls to the native method 3120 and routes these to the underlying native code. The dynamic class loader 3130 loads, links and initializes classes. The first time a class is referenced, its class file is located; the bytes in the class file are loaded into memory and the class in further linked into the runtime system at initialization.

The JVM 3125 includes an instruction that allocates memory on the heap 3160 for a new object but includes no instruction for freeing the memory. The JVM 3125 is responsible for deciding when to free memory occupied by objects that are no longer referenced by the running application. As described below, JVM 3125 uses a garbage collector thread ("garbage collector") to manage the heap 3160. (Alternatively, the JVM can use a thread provided by the Java application to carry out the garbage collection. This provides an advantage of allowing the Java application to initiate its own garbage collection process without having to stop all other JVMs.) While only one JVM is shown in FIG. 3, in last some embodiments, multiple such JVMs are running on system 16.

As described below, freeing memory in system 16 and making memory space available for object allocation may be initiated in any of multiple ways. For example, the freeing of memory space may occur when memory becomes low or reaches a pre-defined threshold. Thereafter, the memory space in the memory occupied by the object is reclaimed. In the depicted examples, references to objects are to objects in an object oriented environment. These processes may be implemented in a number of different environments in which memory management is desired.

Figure 4:
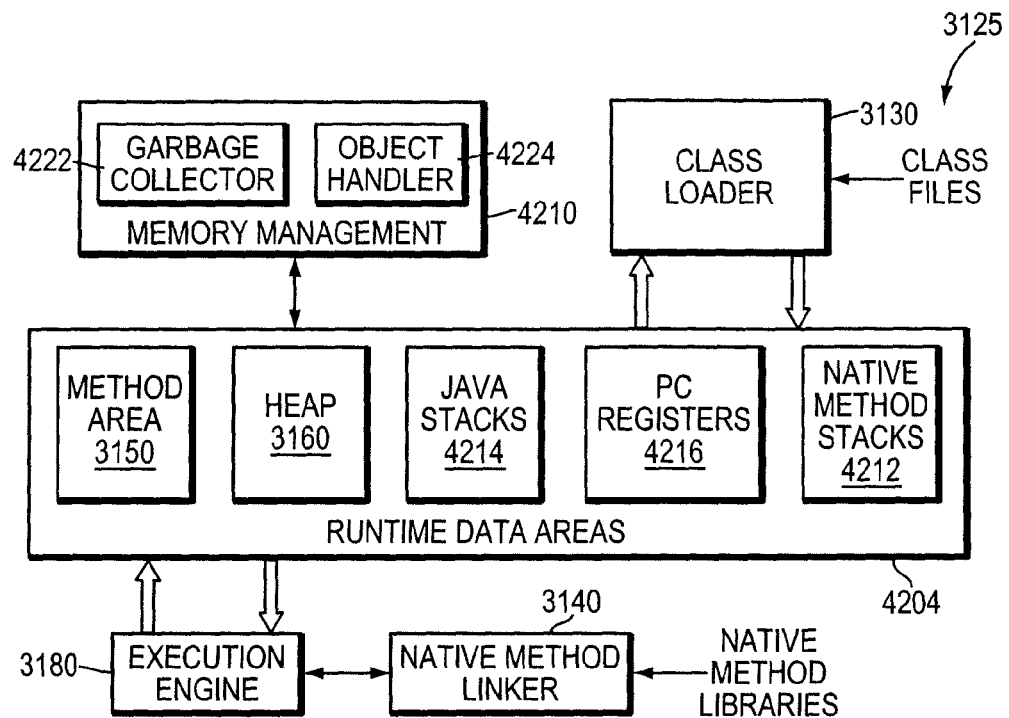

With reference now to FIG. 4, JVM 3125 as further described includes class loader 3130 for loading types, such as classes and interfaces, given fully qualified names. JVM 3125 also contains runtime data areas 4204, execution engine 3180, native method interface 3140, and memory management 4210. Execution engine 3180 executes instructions contained in the methods of classes loaded by class loader 3130. Execution engine 3180 may include, for example, a Java interpreter or a just in time compiler. Native method interface 3140 allows access to resources in operating system 3190. Native method interface 3140 may be, for example, a Java native interface.

Runtime data areas 4204 contains native method stacks 4212, Java stacks 4214, PC registers 4216, method area 3150, and heap 3160. These different data areas represent the organization of memory needed by JVM 3125 to execute a program. Java stacks 4214 is used to store the state of Java method invocations while PC registers 4216 is used to indicate the next instruction to be executed. Native method stacks 4212 stores the state of invocations of native methods. Method area 3150 contains class data while heap 3160 contains all instantiated objects. Each time a class instance or array is created, the memory for the new object is allocated from heap 3160. JVM 3125 includes an instruction that allocates memory space within the memory for heap 3160, but includes no instruction for freeing that space within the memory. Memory management 4210 in the depicted example manages memory space within the memory allocated to heap 3160. Memory management 4210 may include a garbage collector 4222, which automatically reclaims memory used by objects that are no longer referenced by an application. Additionally, garbage collector 4222 also may move objects to reduce heap fragmentation. Memory management 4210 also may include an object handler 4224, which implements at least some of the processes of the technique described herein.

Figure 5:
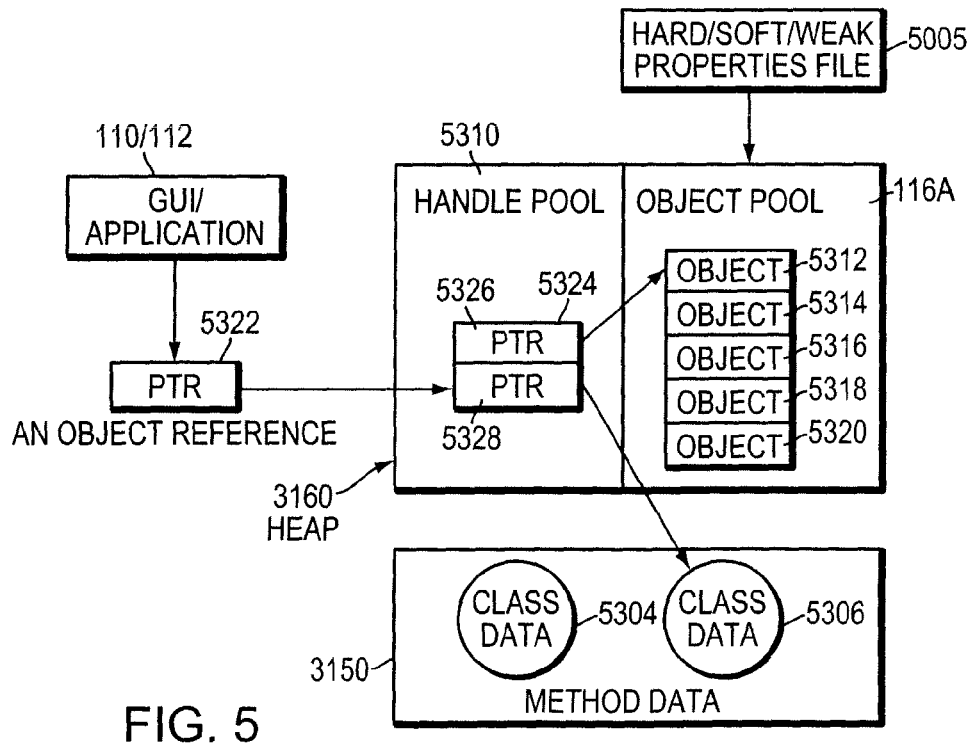

With reference now to FIG. 5, heap 3160 and method area 3150 are shown. Method area 3150 includes class data 5304 and class data 5306. Heap 3160 contains object pool 116a and a handle pool 5310 in which object pool 116a contains objects 5312-5320. These objects are accessed using object references, which are pointers to handles in handle pool 5310.

When an object, such as object 5312, is to be accessed, an object reference 5322 is provided, which is a pointer to handle 5324 in handle pool 5310. In this example, handle 5324 includes a pointer 5326, which points to object 5312 in object pool 116a. In addition, handle 5324 also includes a pointer 5328, which points to class data 5306 in method area 3150.

In accordance with the technique described herein, object pool 116a can provide hard reference, soft reference, and/or weak reference features. When object pool 116a starts up, it attempts to determine from properties file 5005 which type of reference to use for its objects: hard, soft, or weak. If the determination cannot be made, the object pool may use a default (e.g., to soft references). If properties file 5005 exists, it thereby allows system 16 to be so configured without reinstalling software or requiring additional user input.

Figure 6:
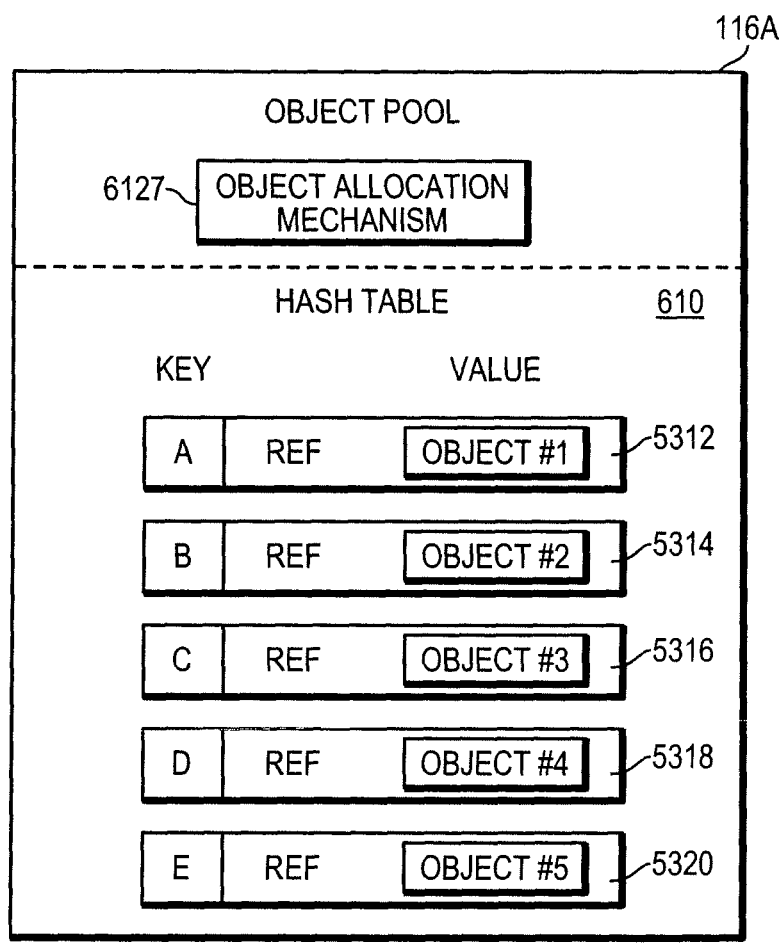

FIG. 6 illustrates an example implementation of object pool 116a. Object allocation mechanism 6127, which may be, include, or be included in object handler 4224, interacts with hash table 610. If the object pool has been configured for soft or weak references, when an object is created, the object is stored wrapped in a soft or weak reference, respectively, that constitutes a value associated with a key that is made available to an entity such as application 112 or GUI 110 that may use the object. Unlike hard references, which do not allow garbage collection to collect objects being referenced, soft or weak references allow objects to be collected. In the soft reference case, the objects may be collected if the JVM is nearing an out of memory point, such that, in at least one implementation, objects held by the object pool which has been configured for soft references cannot cause an out of memory error.

If the entity holds a hard reference (e.g., reference 4322) to the object, the object is not subject to garbage collection and the entity can access the object by passing the key to the object pool.

If the entity does not hold the hard reference, the object may be subject to garbage collection depending on whether the object pool has been configured for soft or weak references. If the entity passes the key to the object pool and determines that the object no longer exists due to garbage collection, the entity can use the key to request recreation of the object in the object pool, with properties retrieved if necessary from one or more of data storage systems 12.

Depending on the implementation, if the object pool has been configured for soft or weak references and an object is requested that no longer exists due to garbage collection, it may be the responsibility of the object pool or the requesting entity to cause the object to be recreated. If the object pool, it may be done transparently to the requesting entity. If the requesting entity, the requesting entity can execute accordingly, e.g., by warning the user to wait if a delay is expected due to any network calls required to recreate the object or populate its properties.

In at least some cases, the object may be recreated from the key based on lightweight information in the key itself. For example, if the entity needs only the object and not its properties (e.g., to delete a LUN), system 16 need not generate network calls to data storage systems 12 for properties.

In a particular example in which system 16 operates in accordance with above-referenced U.S. patent application Ser. No. 12/164,407 and in which object pool 5308 is or includes CIMAPI object pool and objects 5312-5320 are or include CIMObjects, object pool 5308 holds only weak references to objects 5312-5320. This allows objects that are not being used elsewhere to be removed from memory. Also in the example, a CIMAPI indication manager in application 112 or GUI 110 does not hold a reference to a CIMObject but to the instanceName (e.g., key) of the object. This allows an indication to be registered on an object that is not in memory. In the example, the tree (model builders and view builders) only hold references to instanceNames instead of the CIMObject making the objects eligible for garbage collection after they have been processed. For example, a tree node label can be generated using the properties of the CIMObject, and the builder can then register observers on the object and drop the reference to the CIMObject. This makes the CIMObject and all properties within it eligible for garbage collection.

Further with respect to above-referenced U.S. patent application Ser. No. 12/164,407, new objects may be requested when the user expands a tree view or displays a next level of nodes, and additional property data may be needed for needed from systems 12 when the user right clicks for more properties.

In at least some cases it is impractical for the JVM to retain all objects corresponding to logical objects in systems 12 or even all objects previously created, at least because one or more of systems 12 may have a large number (e.g., 100,000) of logical objects each of which may require a significant amount of memory (e.g., 2 kb) itself and may cause other memory to be consumed as well (e.g., for metadata).

With respect to retaining objects, cooperation is needed from entities requesting objects from the object pool, in that such entities should not hold hard references to such objects longer than necessary, since the object pool cannot make objects available for garbage collection until such references are released regardless of when the object pool is configured for soft or weak references. For example, if a dialog in GUI 110 is to display properties for a LUN, the dialog gets the LUN's object in object pool 116a, displays the properties, and then drops its reference to the object so that the object will be subject to reference settings of the object pool which may make the object available for garbage collection.

Depending on the implementation, the technique may be used in an environment other than Java that may or may not provide garbage collection. For example, an object pool may provide its own facility to free up object resources that are not being referenced, perhaps as triggered by a low memory warning.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing memory in displaying data storage system information, the method comprising:
    providing a graphical user interface (GUI) associated with an application comprising a set of GUI components representative of a set of logical objects in a data storage system;
    storing, in an object pool associated with the application, a software object corresponding to a GUI component of the set of GUI components, wherein the software object is stored in the object pool based on an operation performed using the GUI;
    storing, in a handle pool associated with the application, a reference to the software object corresponding to the GUI component of the set of GUI components, wherein the reference includes a pointer to the software object, wherein the software object is accessed by using the reference;
    configuring the object pool by determining from a properties file, a type of reference the object pool should hold for the software object, wherein the properties file is associated with the object pool and includes information indicating the type of reference for each software object of a set of software objects of the object pool, wherein the set of software objects includes at least two software objects representing at least two logical objects of different type, wherein a soft reference type indicates holding a soft reference to the software object, wherein a weak reference type indicates holding a weak reference to the software object;
    based on the type of reference determined from the properties file, making the set of software objects of the object pool available for reuse by the GUI associated with the application;
    based on the type of reference determined from the properties file, in the object pool, making the software object available for garbage collection when the GUI releases a reference to the software object; and
    based on the type of reference determined from the properties file, recreating the software object by using a key upon determining that the software object does not exists due to the garbage collection, wherein the key is associated with the type of reference, wherein the key is provided to an entity using the software object, wherein recreating the software object includes determining whether the software object can be recreated from information stored in the key and based on the determination, retrieving a set of properties for the software object from the data storage system.

2. The method of claim 1, further comprising:
in the object pool, releasing resources of the software object when no entity holds a reference to the software object.

3. The method of claim 1, further comprising:
in the object pool, releasing resources of the software object when the memory usage is high and no entity has a reference to the software object.

4. The method of claim 1, further comprising:
reclaiming memory space in memory occupied by the software object when available memory reaches a pre-defined threshold.

5. The method of claim 1, further comprising:
by a garbage collector, automatically reclaiming memory used by the software object.

6. The method of claim 1, further comprising:
determining from a properties file whether the object pool should hold a soft reference to the software object.

7. The method of claim 1, further comprising:
determining from a properties file whether the object pool should hold a weak reference to the software object.

8. The method of claim 1, further comprising:
when a key is passed to the object pool and it is determined that the software object no longer exists due to garbage collection, using the key to request recreation of the software object in the object pool.

9. The method of claim 1, further comprising:
when an entity passes a key to the object pool and it is determined that the software object no longer exists due to garbage collection, causing the entity to cause the software object to be recreated.

10. The method of claim 1, further comprising:
when an entity passes a key to the object pool and it is determined that the software object no longer exists due to garbage collection, causing the software object to be recreated transparently to the entity.

11. The method of claim 1, further comprising:
when an entity passes a key to the object pool and it is determined that the software object no longer exists due to garbage collection, causing the software object to be recreated based on lightweight information in the key.

12. The method of claim 1, wherein a software object of the set of software objects represent a storage resource of the data storage system.

13. A system for use in managing memory in displaying data storage system information, the system comprising:
first logic providing a graphical user interface (GUI) associated with an application comprising a set of GUI components representative of a set of logical objects in a data storage system;
second logic storing, in an object pool, associated with the application, a software object corresponding to a GUI component of the set of GUI components, wherein the software object is stored in the object pool based on an operation performed using the GUI;
third logic storing, in a handle pool associated with the application, a reference to the software object corresponding to the GUI component of the set of GUI components, wherein the reference includes a pointer to the software object, wherein the software object is accessed by using the reference;
fourth logic configuring the object pool by determining from a properties file, a type of reference the object pool should hold for the software object, wherein the properties file is associated with the object pool and includes information indicating the type of reference for each software object of a set of software objects of the object pool, wherein the set of software objects includes at least two software objects representing at least two logical objects of different type, wherein a soft reference type indicates holding a soft reference to the software object, wherein a weak reference type indicates holding a weak reference to the software object;
fifth logic making, based on the type of reference determined from the properties file, the set of software objects of the object pool available for reuse by the GUI associated with the application;
sixth logic making, based on the type of reference determined from the properties file, in the object pool, the software object available for garbage collection when the GUI releases a reference to the software object; and
seventh logic recreating, based on the type of reference determined from the properties file, the software object by using a key upon determining that the software object does not exists due to the garbage collection, wherein the key is associated with the type of reference, wherein the key is provided to an entity using the software object, wherein recreating the software object includes determining whether the software object can be recreated from information stored in the key and based on the determination, retrieving a set of properties for the software object from the data storage system.

14. The system of claim 13, further comprising:
eighth logic releasing, in the object pool, resources of the software object when no entity holds a reference to the software object.

15. The system of claim 13, further comprising:
eighth logic releasing, in the object pool, resources of the software object when the memory usage is high and no entity has a reference to the software object.

16. The system of claim 13, further comprising:
eighth logic reclaiming memory space in memory occupied by the software object when available memory reaches a pre-defined threshold.

17. The system of claim 13, further comprising:
eighth logic automatically reclaiming, by a garbage collector, memory used by the software object.

* * * * *